United States Patent [19]

Kakizaki et al.

[11] Patent Number: 4,696,765
[45] Date of Patent: Sep. 29, 1987

[54] SEMICONDUCTIVE RESIN COMPOSITION

[75] Inventors: Tetsuji Kakizaki; Toshikazu Mizutani; Hiroshi Yui, all of Mie, Japan

[73] Assignee: Mitsubishi Petrochemical Co., Ltd., Tokyo, Japan

[21] Appl. No.: 663,593

[22] Filed: Oct. 18, 1984

[30] Foreign Application Priority Data

Oct. 27, 1983 [JP] Japan ................. 58-201347

[51] Int. Cl.$^4$ .............................. H01B 1/06
[52] U.S. Cl. .................. 252/511; 524/495; 524/496
[58] Field of Search .......... 252/502, 511; 524/495, 524/496; 174/102 SC, 102 SP; 423/447.3

[56] References Cited

U.S. PATENT DOCUMENTS

| | | | |
|---|---|---|---|
| 4,246,142 | 1/1981 | Ongchin | 252/511 |
| 4,421,678 | 12/1983 | Mehta | 252/511 |
| 4,493,787 | 1/1985 | Taniguchi et al. | 524/495 |
| 4,587,039 | 5/1986 | Yamaoka et al. | 252/511 |

FOREIGN PATENT DOCUMENTS 2723488 11/1978 Fed. Rep. of Germany.

*Primary Examiner*—Josephine L. Barr
*Attorney, Agent, or Firm*—Oblon, Fisher, Spivak, McClelland, & Maier

[57] ABSTRACT

A semiconductive resin composition used in power cables having excellent properties is disclosed, which comprises 100 parts by weight of a base resin of at least one member selected from the group consisting of a low-density polyethylene, an ethylene/vinyl acetate copolymer having a vinyl acetate content of 25% by weight or less and an ethylene/(meth)acrylate copolymer having a (meth)acrylate content of 20% by weight or less, and 6 to 25 parts by weight of electroconductive carbon black having a DBP-absorption number of 220 to 340 ml/100 g and an impurity metal residue of 0.2% by weight or less.

15 Claims, 2 Drawing Figures

SEMICONDUCTIVE RESIN COMPOSITION

FIELD OF THE INVENTION

This invention relates to an extrusion type semiconductive resin composition for use in power cables.

BACKGROUND OF THE INVENTION

Power cables, particularly power cables insulated with cross-linked polyethylene layer, have heretofore had semiconductive layers formed on each inside and outside the insulating layer for the purpose of moderating electric field. In the sense of avoiding corona discharge, these semiconductive layers are required to intimately contact or bond to the insulating coating without allowing occurrence of any gap. From this point of view, extrusion type semiconductive layers are predominant at present.

The properties required in the semiconductive layers are stable electric conductivity against shear and temperature during processing and also heat cycle, resistance to heat over long periods of time (resistance to thermal aging), extrusion moldability, smoothness of extruded surface, intimate adhesiveness with the insulating layer, resistance to heat distorsion, and thermal stability at high temperatures (generation of corrosive thermal decomposition gas during the cross-linking step is less).

At present, as a conductive carbon black used in these semiconductive layers, acetylene black and furnace black are predominant.

For the semiconductive layer to secure necessary electroconductive level, it is generally required to contain such conductive carbon black in a large amount of 40 to 70 parts by weight per 100 parts by weight of the resin. Such a large amount of the conductive carbon black tends to deteriorate physical properties of raw materials used and extrusion moldability of the composition. As the base resin, therefore, ethylene/vinyl acetate copolymer (EVA) or ethylene/ethyl acrylate copolymer (EEA) which has a high comonomer content is mainly used. In other words, the base resin is required to be a copolymer which is allowed to have an increased comonomer content and acquire pliability and flexibility.

In the case of the semiconductive resin composition described above, since the base resin has a high polar group content, the composition has a high water absorption property and tends to exert adverse effects upon the electric property of the cable. Further, the composition has its electric property as high temperatures rendered unstable because the temperatures of the base resin for fusion and crystallization are lowered. The intimate adhesiveness of the resin composition with the insulating coating is not necessarily sufficient, because this composition has a different thermal expansion coefficient from the insulative polyethylene and the composition produces a delicate difference of surface energy from polyethylene due to the effect of the polar group. Particularly, when EVA is used as the base resin, it has a disadvantage that it will undergo thermal decomposition with evolution of corrosive gas during the stage of cross-linking and induce various troubles.

In the case of carbon black, "KETJEN BLACK" (trade name, a product by AKZO Co.), which can give a high conductivity in a small amount, since it has a large amount of impurity metal residue (ash), the resin composition containing this carbon black has an extremely poor resistance to thermal aging and is not suitable for use over a long period of time. Of various kinds of carbon black, this carbon black ranks high in terms of the DBP-absorption number (determined in accordance with JIS K-6221 by allowing 15 g of a sample carbon black to absorb dibutyl phthalate (DBP), measuring the volume in ml or DBP absorbed in the sample, and converting the value measured to the amount per 100 g of carbon black; the larger the value, the more the electroconductivity excellent) and, therefore, is advantageous in terms of electroconductivity. It nevertheless, suffers from a poor compatibility with the resin and, as a result, tends to form large protuberances in the co-extrusion boundary to the insulating polyethylene and adversely affect the electric property of the power cables produced.

SUMMARY OF THE INVENTION

An object of this invention is to provide an extrusion type semiconductive resin composition for use in power cables, which overcomes the aforementioned drawbacks of the prior arts, possesses stable conductivity and resistance to thermal aging, and excellent extrusion moldability.

The semiconductive resin composition according to this invention comprises (A) 100 parts by weight of a base resin of at least one member selected from the group consisting of a low-density polyethylene, an ethylene/vinyl acetate copolymer having a vinyl acetate content of 25% by weight or less, and an ethylene/(meth)acrylate copolymer having a (meth)acrylate content of 20% by weight or less, and (B) 6 to 25 parts by weight of an electroconductive carbon black having a DBP-absorption number of 220 to 340 ml/100 g as determined by JIS K-6221 and impurity metal residue of 0.2% by weight or less.

DETAILED DESCRIPTION OF THE INVENTION

Figure 1:
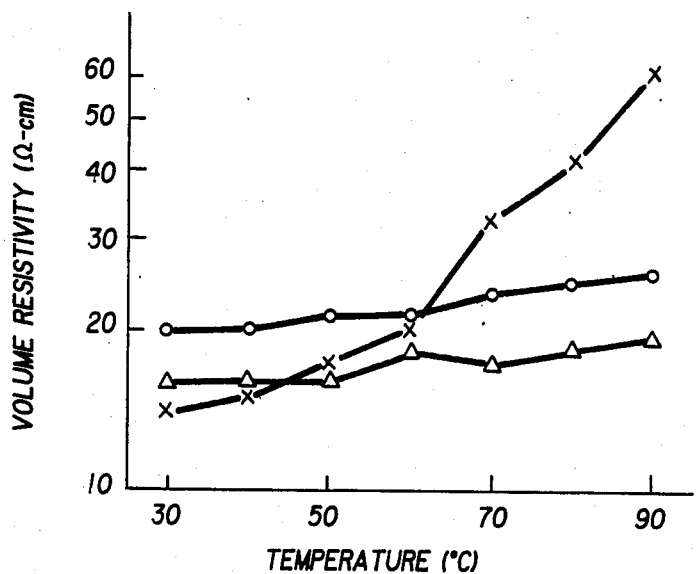
FIG. 1 is a graph showing the data of temperature dependency of volume resistivity of the compositions of Example 10 and Example 5, wherein the curve A shows the data of the composition using 60 parts by weight of acetylene black, the curve B shows the data of the composition using 15 parts by weight of electroconductive carbon black and the curve C shows the data of the composition of Example 5.

The low-density polyethylene used as the base resin in this invention is a low-density or linear low-density polyethylene having a density of 0.910 to 0.934 g/cm$^3$ produced by various polymerization methods. It is desired to have an MI (melt index defined by JIS K-7210) in the range of about 0.5 to 60 g/10 minutes. Specific examples of low-density polyethylene are an ethylene homopolymer and an ethylene/α-olefin copolymer having the α-olefin content of 10 or less. Examples of such α-olefin are propylene, butene-1 and pentene-1.

The low-density polyethylene can be used alone or in mixtures thereof.

The ethylene/vinyl acetate copolymer (EVA) used as the base resin in this invention must have a vinyl acetate content of 25% by weight or less, preferably 15% by weight or less. It is preferred for the copolymer to have an MI (melt index defined by JIS K-7210) in the range of 0.5 to 50 g/10 minutes. If the vinyl acetate content exceeds the upper limit of the range described above, the EVA manifests various effects due to free acetic acid and is not suitable for use in a power cable.

The ethylene/(meth)acrylate copolymer used as the base resin in the present invention must have the (meth)acrylate content of 20% by weight or less, preferably 15% by weight or less. It is preferred for the copolymer to have an MI (melt index defined by JIS K-7210) in the range of 0.5 to 50 g/10 minutes. A preferred example of the copolymer is ethylene/ethyl acrylate copolymer (EEA).

The ethylene/(meth)acrylate copolymer having the (meth)acrylate content exceeding the upper limit of the range described above is not suitable for use in a power cable.

The electroconductive carbon black used in this invention has a DBP-absorption number in the range of 220 to 340 ml/100 g as measured by JIS K-6221 and an impurity metal residue of 0.2% by weight or less. The carbon black which is produced simultaneously with synthesis gas in the partial oxidation of liquid hydrocarbon in a furnace in the presence of molecular oxygen and steam is preferred. The preferred conditions to produce the carbon black are such that the temperature in the furnace used for the partial oxidation falls in the range of 1,200° C. to 1,500° C., preferably 1,300° C. to 1,450° C., the pressure in the furnace falls in the range of 10 to 80 kg/cm$^2$, preferably 25 to 80 kg/cm$^2$, and the amount of steam fed to the furnace falls in the range of 200 to 800 kg, preferably 300 to 800 kg, per ton of the hydrocarbon as the raw material.

The liquid hydrocarbon used herein is required to have a carbon atom/hydrogen atom weight ratio of at least 9 as determined by elementary analysis. Examples of the liquid hydrocarbon are ethylene heavy end, carbon oil, and mixed oils of aromatic liquid hydrocarbon and heavy oil C. Particularly, ethylene heavy end and carbon oil which have a carbon atom/hydrogen atom weight ratio of 12 or more are preferred because those permit to decrease the ash content in the carbon black produced.

Preferably, the electroconductive carbon black is desired to have a DBP-absorption number of 240 ml/100 g or more and 320 ml/100 g or less and an impurity metal residue of 0.15% by weight or less.

The electroconductive carbon black with a low DBP-absorption number can be obtained by decreasing the amount of steam fed and the oxygen concentration in the partial oxidation. The methods of lowering impurity metal residue in the electroconductive carbon black include, for example, not only a method of using as the liquid hydrocarbon either ethylene heavy end or carbon oil having a carbon atom/hydrogen atom weight ratio of not less than 12, but also pre-treatment methods such as a method of filtering the liquid hydrocarbon to remove its ash content, a method of removing the ash content by centrifugal separation and a method of removing its content by distillation, and post-treatments such as a method of removing its ash content by acid treating the carbon slurry produced with, for example, a strong acid.

If the carbon black has its DBP-absorption number of impurity metal residue outside the above-described range, the composition containing such a carbon black cannot exhibit the effect of this invention.

The electroconductive carbon black is used in the amount of 6 to 25 parts by weight, preferably 10 to 20 parts by weight, per 100 parts by weight of the base resin. If the amount thereof is less than 6 parts by weight, the composition produced does not possess the desired stable electroconductive level. If the amount thereof exceeds 25 parts by weight, the mechanical property and extrusion moldability of the semiconductive material tends to deteriorate.

In accordance with JIS K-6221, the DBP-absorption number is determined by the following procedure. In the mixing chamber of an absorptometer (Cabot B type), 15 g of dry carbon black is placed and DBP (dibutyl phthalate, density: 1.042 to 1.047 g/ml) is added thereto dropwise at a constant rate (4±0.02 ml/min). The carbon black on which DBP is adsorbed transforms itself from the natural flowing state to a semiplastic bulk state and accordingly, the torque increases with increase of the viscosity. The amount of DBP added dropwise when the torque reaches a prescribed value (maximum torque×0.7) is read directly from the scale of the buret. The amount of DBP added dropwise per 100 g of carbon black is calculated and determined as the DBP-absorption number of the carbon black.

The preparation of the semiconductive resin composition is carried out according to the preparation of the conventional composition while mixing the desired antioxidant, processing stabilizer, lubricant, etc.

The composition of this invention may be used in an uncross-linked or cross-linked form. If it is used in a cross-linked form, the cross-linking can be effected by using an organic peroxide cross-linking agent such as dicumyl peroxide, 1,3-bis(t-butylperoxyisopropyl)benzene, or 2,5-dimethyl-2,5-di(t-butylperoxy)hexine-3. If desired, the composition may be prepared by additionally using a rubber or resin such as an ethylene/propylene copolymer, an ethylene/propylene/diene copolymer or an ethylene/butene-1 copolymer in an amount such that the composition does not lose its inherent properties.

The composition of this invention can be easily obtained by using a batchwise kneader such as Banbery mixer, roll or Brabender plastograph, or a continuous kneader such as a two-shaft screw extruder.

The present invention will be now explained in more detail by reference to the following Examples and Comparative Examples but the invention is not to be construed as being limited thereto. Unless otherwise indicated, all percents, parts, ratios and the like are by weight.

| EXAMPLE 1 | |
|---|---|
| EVA (density: 0.94 g/cm$^3$, MI: 12.0 g/10 min, vinyl acetate content: 20%) | 100 parts |
| Electroconductive carbon black (DBP-absorption number: 287 ml/100 g, impurity metal residue: 0.1%) | 12 part |
| Cross-linking agent | 1.5 parts |
| Antioxidant | 0.5 part |
| Lubricant | 0.3 part |
| EXAMPLE 2 | |
| EVA (same as in Example 1) | 100 parts |
| Electroconductive carbon black (DBP-absorption number: 320 ml/100 g, impurity metal residue: 0.04%) | 12 parts |
| Cross-linking agent | 1.5 parts |
| Antioxidant | 0.5 part |
| Lubricant | 0.3 part |
| COMPARATIVE EXAMPLE 1 | |

-continued

| | |
|---|---|
| EVA (same as in Example 1) | 100 parts |
| Electroconductive carbon black (DBP-absorption number: 360 ml/100 g, impurity metal residue: 0.4%) | 12 parts |
| Cross-linking agent | 1.5 parts |
| Antioxidant | 0.5 part |
| Lubricant | 0.3 part |

COMPARATIVE EXAMPLE 2

| | |
|---|---|
| EVA (same as in Example 1) | 100 parts |
| Electroconductive carbon black (acetylene black made by Denki Kagaku Kogyo K.K., DBP-absorption number: 210 ml/100 g, impurity metal residue: 0.06%) | 45, 50 or 55 parts |
| Cross-linking agent | 1.5 parts |
| Antioxidant | 0.5 part |
| Lubricant | 0.3 part |

EXAMPLE 3

| | |
|---|---|
| EVA (density: 0.94 g/cm$^3$, MI: 3.1 g/10 min, vinyl acetate content: 9.0%) | 100 parts |
| Electroconductive carbon black (DBP-absorption number: 305 ml/100 g, impurity metal residue: 0.06%) | 12 parts |
| Cross-linking agent | 1.5 parts |
| Antioxidant | 0.5 part |
| Lubricant | 0.3 part |

EXAMPLE 4

| | |
|---|---|
| EVA (same as in Example 1) | 100 parts |
| Electroconductive carbon black (same as in Example 1) | 14 or 16 parts |
| Cross-linking agent | 1.5 parts |
| Antioxidant | 0.5 part |
| Lubricant | 0.3 part |

EXAMPLE 5

| | |
|---|---|
| Low-density polyethylene (density: 0.920, MI: 1.0) | 100 parts |
| Electroconductive carbon black (same as in Example 2) | 13 parts |
| Cross-linking agent | 1.5 parts |
| Antioxidant | 0.5 part |
| Lubricant | 0.3 part |

COMPARATIVE EXAMPLE 3

| | |
|---|---|
| Low-density polyethylene (same as in Example 5) | 100 parts |
| Electroconductive carbon black (same as in Comparative Example 2) | 55 parts |
| Cross-linking agent | 1.5 parts |
| Antioxidant | 0.5 part |
| Lubricant | 0.3 part |

COMPARATIVE EXAMPLE 4

| | |
|---|---|
| EEA (density: 0.94, MI: 200, ethyl acrylate content: 25%) | 100 parts |
| Electroconductive carbon black (same as in Example 2) | 12 parts |
| Cross-linking agent | 1.5 parts |
| Antioxidant | 0.5 part |
| Lubricant | 0.3 part |

EXAMPLE 6

| | |
|---|---|
| EEA (density: 0.93, MI: 5, ethyl acrylate content: 18%) | 100 parts |
| Electroconductive carbon black (same as in Example 2) | 12 parts |
| Cross-linking agent | 1.5 parts |
| Antioxidant | 0.5 part |
| Lubricant | 0.3 part |

COMPARATIVE EXAMPLE 5

| | |
|---|---|
| EVA (same as in Example 1) | 100 parts |
| Electroconductive carbon black (DBP-absorption number: 205 ml/100 g, impurity metal residue: 0.06%) | 25 parts |
| Cross-linking agent | 1.5 parts |
| Antioxidant | 0.5 part |
| Lubricant | 0.3 part |

EXAMPLE 8

| | |
|---|---|
| EVA (same as in Example 1) | 100 parts |
| Electroconductive carbon black (same as in Example 2) | 6 parts |
| Cross-linking agent | 1.5 parts |
| Antioxidant | 0.5 part |
| Lubricant | 0.3 part |

COMPARATIVE EXAMPLE 6

| | |
|---|---|
| EVA (same as in Example 1) | 100 parts |
| Electroconductive carbon black (same as in Example 2) | 4 parts |
| Cross-linking agent | 1.5 parts |
| Antioxidant | 0.5 part |
| Lubricant | 0.3 part |

EXAMPLE 9

| | |
|---|---|
| EVA (same as in Example 1) | 100 parts |
| Electroconductive carbon black (same as in Example 2) | 20 parts |
| Cross-linking agent | 1.5 parts |
| Antioxidant | 0.5 part |
| Lubricant | 0.3 part |

COMPARATIVE EXAMPLE 7

| | |
|---|---|
| EVA (same as in Example 1) | 100 parts |
| Electroconductive carbon black (same as in Example 2) | 30 parts |
| Cross-linking agent | 1.5 parts |
| Antioxidant | 0.5 part |
| Lubricant | 0.3 part |

PREPARATION OF SHEET SAMPLES FOR TESTS (1) TO (4)

A sheet having a thickness of 1 mm, a length of 200 mm and a width of 200 mm was prepared by homogeneously kneading a mixture of a resin, an electroconductive carbon black, a cross-linking agent, an antioxidant and a lubricant as shown in each of the Examples and the Comparative Examples with a roll kneader at 120° C. for 7 minutes and molding the resulting mixture with a compression molding machine under the heating and pressure conditions of 180° C. and 120 kg/cm$^2$ for 20 minutes.

In the preparation, 1,3-bis(t-butylperoxyisopropyl)-benzene was used as the cross-linking agent, 2,2-methylenebis(4-methyl-6-t-butylphenol) as the antioxidant, and zinc stearate as the lubricant.

Further, the electroconductive carbon black was prepared according to the method described in the specification under the conditions shown in Table 1 below.

TABLE 1

| | Example 1 | Example 2 | Comparative Example 1 | Example 3 | Example 7 | Comparative Example 5 |
|---|---|---|---|---|---|---|
| Carbon atom/hydrogen atom weight ratio in ethylene heavy end | 12.5 | 12.5 | 12.5 | 12.5 | 12.5 | 12.5 |
| Temperature in furnace (°C.) | 1,260 | 1,340 | 1,350 | 1,390 | 1,400 | 1,400 |
| Pressure in furnace (kg/cm$^2$) | 30 | 30 | 30 | 30 | 30 | 30 |
| Amount of steam fed (kg/ton) | 394 | 391 | 525 | 395 | 305 | 260 |
| Amount of oxygen fed (nm$^3$/ton) | 567 | 664 | 712 | 676 | 689 | 670 |

Each sheet was subjected to the following testings for evaluation.

METHODS OF EVALUATION

(1) Volume Resistivity

A test piece having a width of 20 mm and a length of 80 mm was punched from the 1 mm thick press sheet. An electrode was produced by applying electroconductive paint ("Dotite RA-3", produced by Fujikura Kasei Co., Ltd.) on the both end faces in the longitudinal direction of the test piece. This electrode was tested for the volume inherent resistivity using the wheatstone bridge method of Japan Rubber Association Standard (SRIS) 2301.

(2) Density

Measured according to the method of standing in water as defined by JIS K-7112, with necessary modifications.

(3) Tensile Strength and Elongation

A dumbbell test piece, No. III, defined by JIS K-7113, was cut from a 1 mm thick press sheet and tested for the tensile strength and elongation with an autograph at a pulling rate of 200 mm/min.

(4) Resistance to Thermal Aging

A test piece was subjected to aging in a gear oven at 150° C. for 7 days and measured for elongation. The resistance to thermal aging is expressed as the percentage of retention to the original value.

(5) Surface Smoothness

A sheet having a thickness of 1 mm and a width of 45 mm was extrusion molded with a 40 mm single shaft extruder (full flighted screw, L/D=22) using a sheet die. The sheet was visually examined on the flat smoothness of the surface (degree of surface irregularities).

The results obtained are shown in Table 2 below.

TABLE 2

| | Example 1 | Example 2 | Comparative Example 1 | Comparative Example 2 | | Example 3 | Example 4 | | Example 5 |
|---|---|---|---|---|---|---|---|---|---|
| Density (g/cm$^3$) | 0.99 | 0.99 | 0.99 | 1.11 | 1.13 | 1.16 | 0.99 | — | — | — |
| Volume inherent resistivity (Ω-cm) | | | | | | | | | | |
| 23° C. | $10^2$ | $10^1$ | $10^1$ | $10^2$ | $10^1$ | $10^1$ | $10^1$ | $10^1$ | $10^1$ | $10^1$ |
| 60° C. | $10^2$ | $10 \sim 10^2$ | $10^1$ | $10^2 \sim 10^3$ | $10 \sim 10^2$ | $10^1$ | $10^2$ | $10^1$ | $10^1$ | $10^1$ |
| 90° C. | $10^2$ | $10^2$ | $10 \sim 10^2$ | $10^4$ | $10^3$ | $10^2 \sim 10^3$ | $10^2$ | $10^1 \sim 10^2$ | $10^1$ | $10^1$ |
| Resistance to thermal aging (percentage of retention of tensile elongation) (%) | 98 | 100 | 30 | 98 | 96 | 95 | 96 | — | — | — |
| Tensile strength (kg/cm$^2$) | 260 | 269 | 254 | 150 | 131 | 124 | 156 | 260 | 218 | 117 |
| Tensile elongation (%) | 493 | 487 | 480 | 278 | 260 | 203 | 575 | 458 | 380 | 333 |
| Surface smoothness | Good | Good | Poor | Good | Good | Good | Good | Good | Good | Good |
| Extrusion moldability | Good | Good | Good | Slightly good | Slightly good | Poor* | Good | Good | Good | Good |

| | Comparative Example 3 | Comparative Example 4 | Example 6 | Example 7 | Comparative Example 5 | Example 8 | Comparative Example 6 | Example 9 | Comparative Example 7 |
|---|---|---|---|---|---|---|---|---|---|
| Density (g/cm$^3$) | — | 0.99 | 0.99 | 1.00 | 1.04 | 0.96 | 0.95 | 1.02 | 1.04 |
| Volume inherent resistivity (Ω-cm) | | | | | | | | | |
| 23° C. | $10^1$ | $10^1$ | $10^1$ | $10^1$ | $10^0$ | $10^2$ | $10^4$ | $10^0$ | $10^0$ |
| 60° C. | $10^1$ | $10^1$ | $10^1$ | $10^1$ | $10^1$ | $10^3$ | $10^7<$ | $10^0$ | $10^0$ |
| 90° C. | $10^1$ | $10^1 \sim 10^2$ | $10^1 \sim 10^2$ | $10^2$ | $10^2$ | $10^4$ | $10^7<$ | $10^0$ | $10^0$ |
| Resistance to thermal aging (percentage of retention of tensile elongation) (%) | — | 90 | 100 | 95 | 98 | 100 | 100 | 88 | 85 |
| Tensile strength (kg/cm$^2$) | Breakage | 203 | 265 | 205 | 217 | 233 | 218 | 283 | 250 |
| Tensile elongation (%) | 50% or less | 560 | 480 | 405 | 132 | 593 | 660 | 180 | 55 |
| Surface smoothness | — | Poor | Good | Good | Good | Good | Good | Good | Good |
| Extrusion moldability | Poor | Good | Good | Good | Poor | Good | Good | Good | Poor |

(Note)
*Excessive extrusion torque

EXAMPLE 10

The same composition as used in Example 1 except that the amount of the electroconductive carbon black was changed to 15 parts, the same composition as used in Example 5 and the same composition as used in Comparative Example 2 except that the amount of the electroconductive carbon black was changed to 60 parts were tested for the temperature dependency of volume inherent resistivity. The results obtained are shown in FIG. 1.

It is apparent from FIG. 1 that although the electroconductive carbon black used in this invention has a low DBP-absorbing capacity which is the measure for electroconductivity as compared to the conventional KETJEN BLACK, the composition possesses excellent electroconductivity and exhibits remarkably lower temperature dependency than the use of acetylene black in spite of a lower amount used thereof. Thus, when the composition is used in power cables, the power cables have the stable performances even under the severe conditions such as heat cycle.

REFERENTIAL EXAMPLE

The compositions of Example 1, Example 2 and Comparative Example 2 were tested for shear rate dependency of viscosity at 120° C. as one measure for extrusion moldability at low temperatures. The results obtained are shown in FIG. 2.

Figure 2:
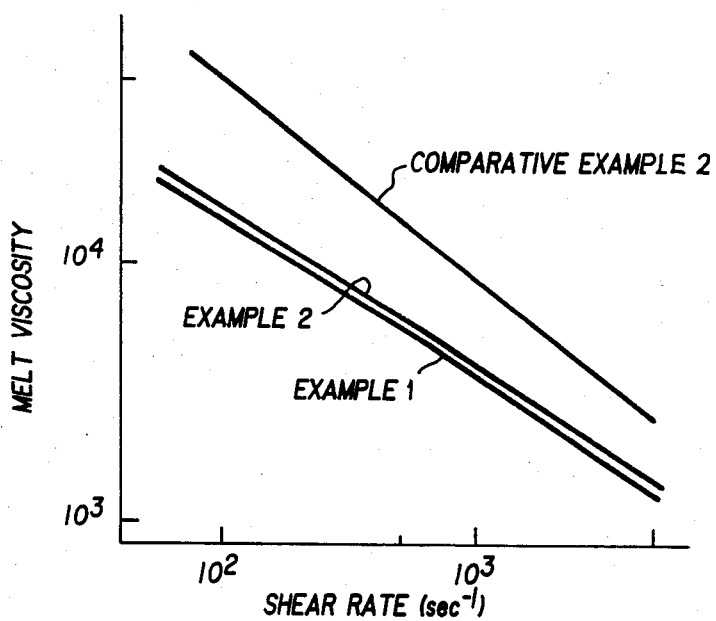
FIG. 2 is a graph showing the data of shear rate dependency of viscosity at 120° C. of the compositions of Example 1, Example 2 and Comparative Example 2.

It is apparent from FIG. 2 that the compositions of this invention have remarkably lower melt viscosity even at low temperatures (in the range of temperatures for extrusion molding of cable) than the compositions containing acetylene black and that this phenomenon is more remarkable in the range of low shear rate. This face indicates that the extrusion molding machine used for manufacture of power cable is not required to have any particularly high torque and various problems such as occurrence of scorching due to the increase of resin pressure within the die are overcome, resulting in improving the moldability.

While the invention has been described in detail and with reference to specific embodiments thereof, it will be apparent to one skilled in the art that various changes and modifications can be made therein without departing from the spirit and scope thereof.

What is claimed is:

1. A semiconductive resin composition comprising:
   (A) 100 parts by weight of a base resin of at least one member selected from the group consisting of a low-density polyethylene, an ethylene/vinyl acetate copolymer having a vinyl acetate content of 25% by weight or less and an ethylene/(meth)acrylate copolymer having a (meth)acrylate content of 20% by weight or less, and
   (B) 6 to 25 parts by weight of an electroconductive carbon black having a DBP-absorption number of 220 to 340 ml/100 g and an impurity metal residue of 0.2% by weight or less.

2. A composition according to claim 1, wherein said component (A) is a low-density polyethylene having a density of 0.910 to 0.934 g/cm$^3$ and a melt index of 0.5 to 60 g/10 minutes.

3. A composition according to claim 1, wherein said component (A) is an ethylene homopolymer or a copolymer of ethylene with 10 mol % or less of other α-olefin.

4. A composition according to claim 3, wherein said other α-olefin is propylene, butene-1 or pentene-1.

5. A composition according to claim 1, wherein said component (A) is an ethylene/vinyl acetate copolymer having a vinyl acetate content of 15% by weight or less.

6. A composition according to claim 1, wherein said component (A) is an ethylene/vinyl acetate copolymer having a melt index of 0.5 to 50 g/10 minutes.

7. A composition according to claim 1, wherein said component (A) is an ethylene/(meth)acrylate copolymer having a (meth)acrylate content of 15% by weight or less.

8. A composition according to claim 1 or claim 7, wherein said component (A) is an ethylene/(meth)acrylate copolymer having a melt index of 0.5 to 50 g/10 minutes.

9. A composition according to claim 8, wherein said component (A) is an ethylene/ethyl acrylate copolymer.

10. A composition according to claim 1, wherein said component (B) is an electroconductive carbon black obtained in the simultaneous production of electroconductive carbon and synthesis gas by the partial oxidation of a liquid hydrocarbon in a furnace in the presence of molecular oxygen and steam under conditions that the carbon atom/hydrogen atom weight ratio in said liquid hydrocarbon is 9 or more, the temperature in the furnace falls in the range of 1,200° C. to 1,500° C., the pressure in the furnace falls in the range of 10 to 80 kg/cm$^2$ and the amount of steam fed to the furnace falls in the range of 200 to 800 kg per ton of said hydrocarbon.

11. A composition according to claim 10, wherein said component (B) is an electroconductive carbon black obtained in the operation of the furnace under conditions that the carbon atom/hydrogen atom weight ratio in the liquid hydrocarbon is 12 or more, the temperature in the furnace falls in the range of 1,300° C. to 1,450° C., the pressure in the furnace falls in the range of 25 to 80 kg/cm$^2$ and the amount of steam fed to the furnace falls in the range of 300 to 800 kg per ton of said hydrocarbon.

12. A composition according to claim 11, wherein said liquid hydrocarbon is an ethylene heavy end or a carbon oil.

13. A composition according to claim 1, wherein said component (B) is an electroconductive carbon black having an DBP-absorption number of 240 to 320 ml/100 g.

14. A composition according to claim 1, wherein said component (B) is an electroconductive carbon black having an impurity metal residue of 0.15% by weight or less.

15. A composition according to claim 1, which comprises 100 parts by weight of said component (A) and 10 to 20 parts by weight of said component (B).

* * * * *